US010169891B2

(12) United States Patent
Auclair et al.

(10) Patent No.: US 10,169,891 B2
(45) Date of Patent: Jan. 1, 2019

(54) PRODUCING THREE-DIMENSIONAL REPRESENTATION BASED ON IMAGES OF A PERSON

(71) Applicant: Electronic Arts Inc., Redwood City, CA (US)

(72) Inventors: David Auclair, Orlando, FL (US);
Gianvito Serra, Austin, TX (US);
Caleb Howard, West Vancouver (CA);
Robert Jay Reynolds, Vancouver (CA);
Gerald Phaneuf, Seattle, WA (US);
Aaron Jeromin, Seattle, WA (US)

(73) Assignee: Electronic Arts Inc., Redwood City, CA (US)

( * ) Notice: Subject to any disclaimer, the term of this patent is extended or adjusted under 35 U.S.C. 154(b) by 83 days.

(21) Appl. No.: 14/836,299

(22) Filed: Aug. 26, 2015

(65) Prior Publication Data
US 2017/0064284 A1    Mar. 2, 2017

(51) Int. Cl.
| | |
|---|---|
| *G06T 11/60* | (2006.01) |
| *G06T 17/20* | (2006.01) |
| *G06T 19/20* | (2011.01) |
| *G06K 9/00* | (2006.01) |

(52) U.S. Cl.
CPC .......... *G06T 11/60* (2013.01); *G06K 9/00214* (2013.01); *G06T 17/20* (2013.01); *G06T 19/20* (2013.01); *G06K 9/00255* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 2006/0094955 | A1* | 5/2006 | Satoh | G01S 5/163 600/426 |
| 2009/0310828 | A1* | 12/2009 | Kakadiaris | G06K 9/00208 382/118 |
| 2013/0141433 | A1* | 6/2013 | Astrand | G06T 7/0051 345/420 |

(Continued)

OTHER PUBLICATIONS

Pighin, Frédéric, et al. "Synthesizing realistic facial expressions from photographs." ACM SIGGRAPH 2006 Courses. ACM, 2006.*

(Continued)

*Primary Examiner* — Vu Nguyen
(74) *Attorney, Agent, or Firm* — Lowenstein Sandler LLP

(57) ABSTRACT

An example method of generating three-dimensional visual objects representing a person based on two-dimensional images of at least a part of the person's body may include receiving a first polygonal mesh representing a human body part, wherein the first polygonal mesh is compliant with a target application topology. The example method may further include receiving a second polygonal mesh representing the human body part, wherein the second polygonal mesh is derived from a plurality of images of a person. The example method may further include modifying at least one of the first polygonal mesh or the second polygonal mesh to optimize a value of a metric reflecting a difference between the first polygonal mesh and the second polygonal mesh.

16 Claims, 15 Drawing Sheets
(12 of 15 Drawing Sheet(s) Filed in Color)

(56) References Cited

U.S. PATENT DOCUMENTS

| | | | | |
|---|---|---|---|---|
| 2013/0142426 A1* | 6/2013 | Kaneda | ............... | G06K 9/4642 |
| | | | | 382/165 |
| 2013/0307848 A1* | 11/2013 | Tena | ...................... | G06T 17/20 |
| | | | | 345/420 |
| 2015/0085179 A1* | 3/2015 | Van Heugten | ..... | H04N 5/23212 |
| | | | | 348/349 |
| 2015/0123967 A1* | 5/2015 | Quinn | .................... | G06T 13/40 |
| | | | | 345/420 |
| 2016/0314616 A1* | 10/2016 | Su | ........................... | G06T 17/00 |

OTHER PUBLICATIONS

"Iterative Closest Point." Wikipedia. Wikimedia Foundation, Feb. 3, 2015. Web. May 30, 2017. <https://en.wikipedia.org/w/index.php?title=Iterative_closest_point&oldid=645521338>.*

NBA Live State Demo—E3 2015 EA Press Conference, Published Jun. 15, 2015. https://www.youtube.com/watch?v=CKHxcH6oITQ.

EA Sports Gameface Overview, 2015 Electronic Arts, Inc., 2 pages. http://www.easports.com/gameface (Last accessed Sep. 4, 2015).

Houdini Engine 1.9: Overview, sidefx.com, 2 pages. http://www.sidefx.com/docs/hengine1.9/_h_a_p_i_overview.html (Last accessed Sep. 4, 2015).

Pulli, Kari, et al. "Real-Time Computer Vision with OpenCV", Communications of the ACE, vol. 55, No. 6, Jun. 2012, pp. 61-69 https://research.nvidia.com/sites/default/files/publications/OpenCV_CACM_p61-pulli.pdf.

Bradski, Gary, "The OpenCV Library", DrDobbs.com, Nov. 2, 2000, 7 pages. http://www.drdobbs.com/open-source/the-opencv-library/184404319.

FaceGen—3D Human Faces, 2 pages, facegen.com http://facegen.com/index.htm (Last accessed Sep. 4, 2015).

FaceGen Modeller, facegen.com, 6 pages http://facegen.com/modeller.htm (Last accesses Sep. 4, 2015).

ZBrush 4R7 What's New Guide, Pixilogic, Inc. 2015, 179 pages http://download.pixologic01.com/download.php?f=Documents/ZBrush4_R4_whats_new.zip (Last accessed Sep. 4, 2015).

Autodesk Maya 2015 Getting Started with Maya, autodesk.com, 2014, 615 pages http://docs.autodesk.com/MAYAUL/2015/ENU/GettingStarted/#!/url=./files/Modeling_a_polygonal_mesh.htm (Last accessed Sep. 4, 2015).

Agisoft PhotoScan User Manual: Professional Edition, Version1.1, agisoft.com, 2014, 85 pages http://www.agisoft.com/pdf/photoscan-pro_1_1_en.pdf (Last accessed Sep. 4, 2015).

Substance Batchtools User's Guide Overview, allegorithmic.com, 2 pages https://support.allegorithmic.com/documentation/display/SB10/Overview (Last accessed Sep. 4, 2015).

* cited by examiner

PRODUCING THREE-DIMENSIONAL REPRESENTATION BASED ON IMAGES OF A PERSON

TECHNICAL FIELD

The present disclosure is generally related to producing computer-generated imagery, and is more specifically related to producing three-dimensional representation based on images of a person.

BACKGROUND

In computer-generated visual content (such as interactive video games), human bodies may be represented by various computer-generated objects, including polygonal meshes and textures. A polygonal mesh herein shall refer to a collection of vertices, edges, and faces that define the shape and/or boundaries of a three-dimensional object. An edge is a line connecting two vertices. A vertex is a point having a certain spatial position. Mesh faces may be provided by various polygonal shapes such as triangles, quads (quadrangles), and/or other regular or irregular polygons. A texture herein shall refer to a projection of an image onto a surface (such as a surface represented by a polygonal mesh).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated by way of examples, and not by way of limitation, and may be more fully understood with references to the following detailed description when considered in connection with the figures, in which.

DETAILED DESCRIPTION

Figure 1:
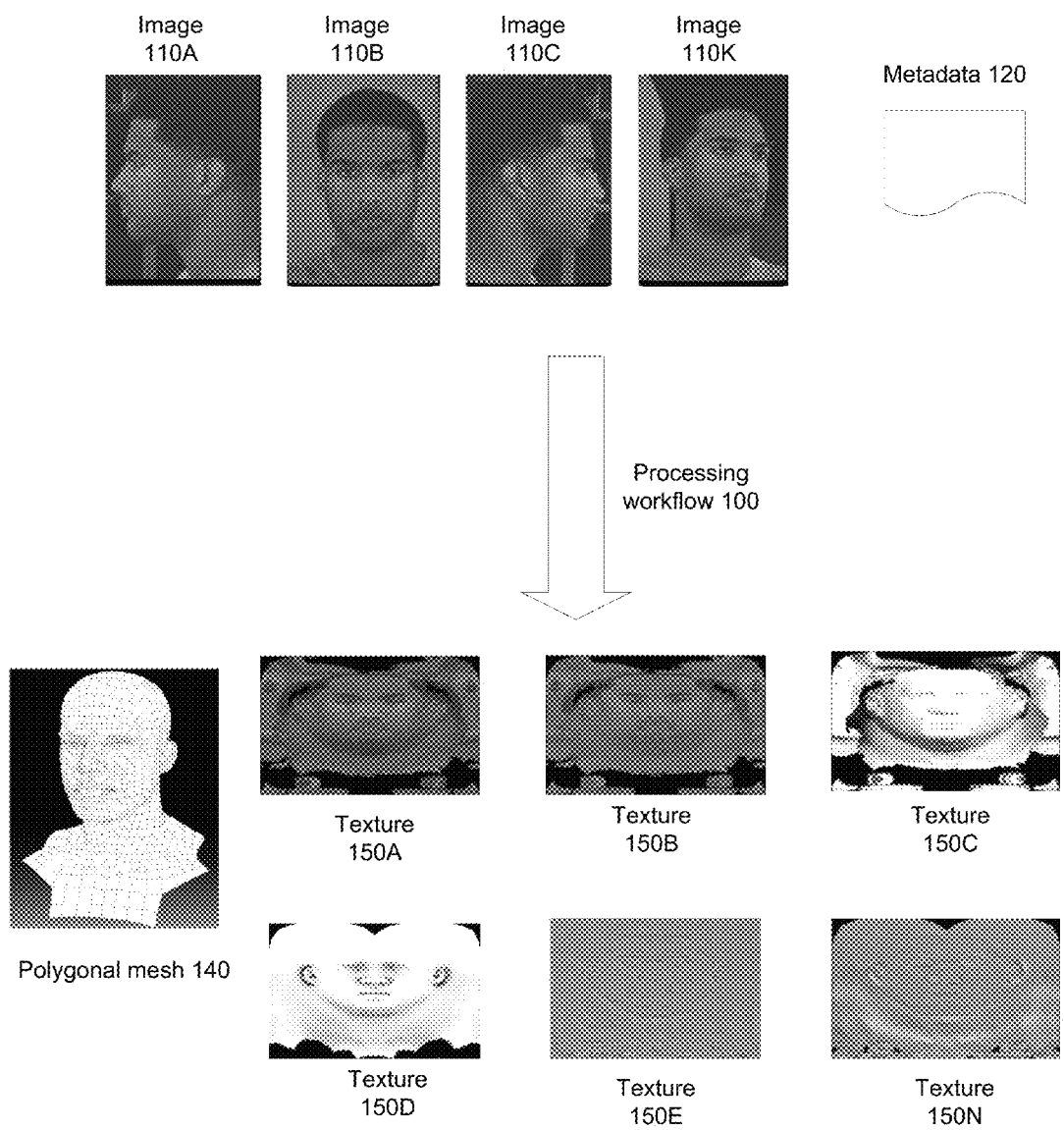
FIG. 1 schematically illustrates input and output files and parameters of a processing workflow operating in accordance with one or more aspects of the present disclosure.

Described herein are methods and systems for generating three-dimensional visual objects representing a person based on two-dimensional images of at least a part of the person's body (e.g., the person's head). Such methods and systems may be employed, for example, in various interactive video game applications for generating three-dimensional visual objects representing a game character having a visual resemblance with a certain person (e.g., a celebrity, or a user of an interactive video game). Example processing workflows operating in accordance with one or more aspect of the present disclosure may acquire a series of images of a person's head and produce application resolution and level of detail (LOD) resolution polygonal meshes and textures, as described in more details herein below. LOD herein refers to a simplified version of the original model that may be employed to simulate views at the modeled object from various distances.

In an illustrative example, a user of an interactive video game may employ a video camera-equipped portable computing device (such as a smartphone) to acquire a series of images showing his or her head from various positions. In another illustrative example, the series of images may be acquired using one or more general purpose or specialized still image cameras, which may be positioned around a stationary object (such as a person's head) and may optionally be equipped with synchronized light sources and auto-focusing lenses designed to produce high-quality images.

The acquired images may be pre-processed (e.g., by an application being executed by the portable computing device), to produce a polygonal mesh representing a rough scan model of the user's head (referred herein as "scan model"). The processing workflow may then upload the acquired images, the scan model, and metadata associated with the acquired images to one or more servers represented by general purpose or specialized computer systems. The scan model may be transformed to align with a base polygonal mesh, which is compliant with the target application topology, as described in more details herein below. Certain anatomical features (e.g., nose, eyes, lips, etc.) may be detected in the original images and projected onto the scan model using the metadata describing the camera position for each image. The base polygonal mesh may then be transformed to align with the scan model, by minimizing the differences in curvatures, point positions, and point normal orientations (e.g., using the iterative closest point and/or simulated annealing optimization methods). The resulting polygonal mesh may than be further processed (e.g., to smooth the geometry, fit the eye balls, etc.). Various textures, such as a light map, shaded color, color, normal, half bent normal, and occlusion textures, for the target application-resolution model and UV space layout may then be generated using the original images and the base polygonal mesh. UV space herein refers to a two-dimensional space that may be employed to represent a texture map of a three-dimensional object, where the letters U and V denote the axes of such space. The processing workflow may then output the application resolution and level of detail (LOD) resolution polygonal meshes and textures.

In certain implementations, the objects produced by the above described processing workflow may be edited by an artist in order to improve certain visual aspects of these objects. Alternatively, the objects produced by the above described processing workflow may be employed in a target application (e.g., interactive video game) without additional processing.

Various aspects of the above referenced methods and systems are described in details herein below by way of examples, rather than by way of limitation.

As schematically illustrated by FIG. 1, an example processing workflow 100 operating in accordance with one or more aspects of the present disclosure receives a series of images 110A-110K showing the head of a person from various positions and certain metadata 120 associated with the images. Based on these inputs, the example processing workflow outputs various visual objects that may be employed for producing three-dimensional computer-generated imagery representing, in a certain target application (such as an interactive video game) a character having a visual resemblance with that person. These visual objects may include a target application topology-compliant polygonal mesh 140 representing the head of the person, and may further include various textures 150A-150N, such as a light map, shaded color, color, normal, half bent normal, and occlusion textures, for the target application-resolution model. In various implementations, example processing workflow may be provided by a workflow comprising any combination of elements from example processing workflows 200 and/or 1200 that are described herein below with references to FIGS. 2 and 12.

Figure 2:
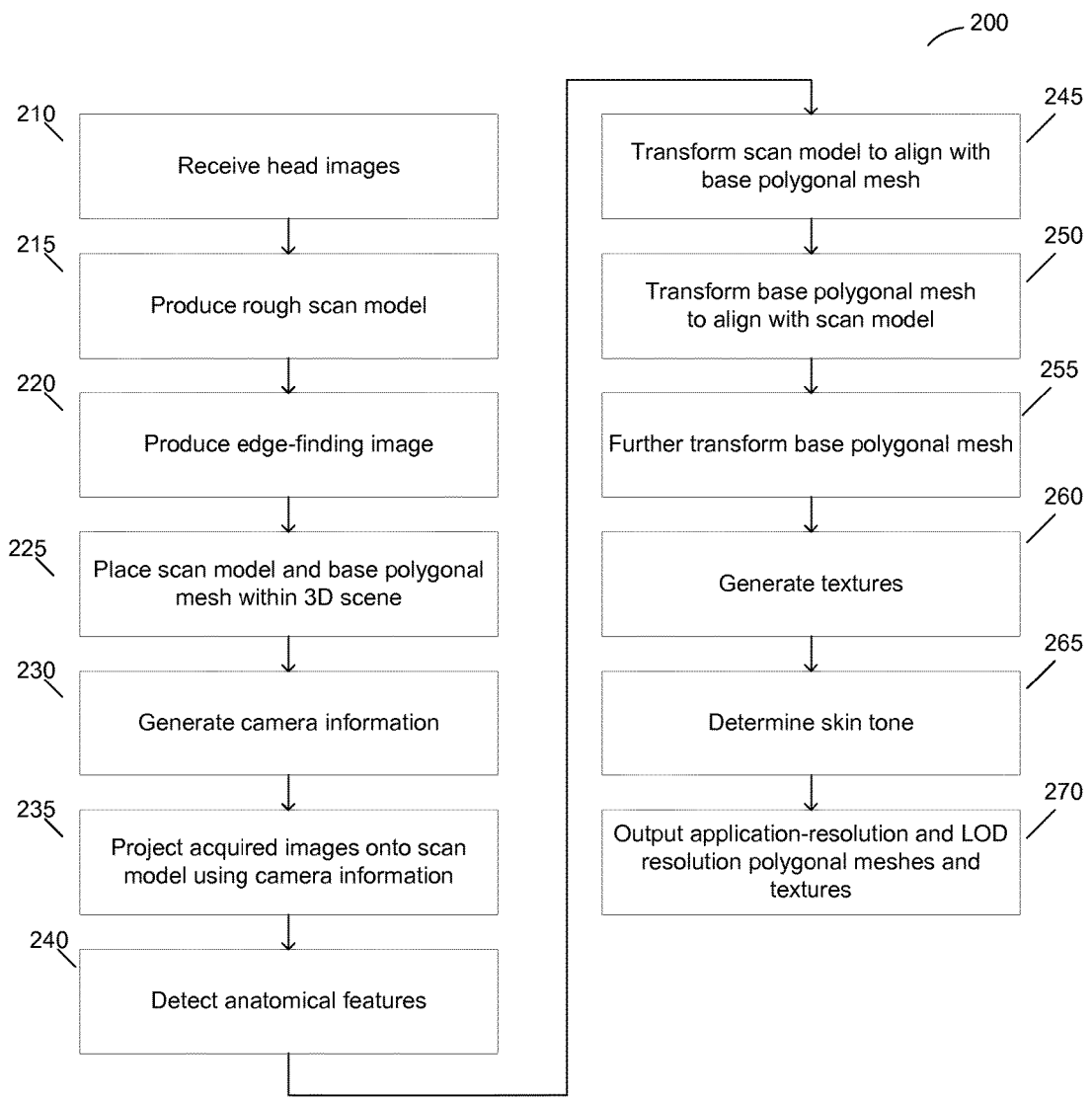
FIG. 2 schematically illustrates a flow diagram of an example fully-automated processing workflow for generating three-dimensional visual objects representing a person based on two-dimensional images of at least a part of the person's body, in accordance with one or more aspects of the present disclosure.

FIG. 2 depicts a flow diagram of an example fully-automated processing workflow 200 for generating three-dimensional visual objects representing a person based on two-dimensional images of at least a part of the person's body, in accordance with one or more aspects of the present disclosure. Processing workflow 200 may be employed for producing visual objects representing a game character having a visual resemblance with a certain person (e.g., a user of an interactive of video game). The visual objects produced by processing workflow 200 may be directly (i.e., without any further processing) used by the target application (such as an interactive video game).

Processing workflow 200 and/or each of its individual functions, routines, subroutines, or operations may be performed by one or more general purpose and/or specialized processing devices. In certain implementations, certain operations of processing workflow 200 may be performed by a mobile computing device, while other operations may be performed by one or more general purpose computer systems (also referred herein as servers), such as computing device 1500, which is described herein below with references to FIG. 15.

Two or more functions, routines, subroutines, or operations of processing workflow 200 may be performed in parallel or in an order which may differ from the order described above. In certain implementations, processing workflow 200 may be implemented by a single processing thread. Alternatively, processing workflow 200 may be implemented by two or more processing threads, each thread executing one or more individual functions, routines, subroutines, or operations of the method. In an illustrative example, the processing threads implementing processing workflow 200 may be synchronized (e.g., using semaphores, critical sections, and/or other thread synchronization mechanisms). Alternatively, the processing threads implementing processing workflow 200 may be executed asynchronously with respect to each other.

At block 210, the processing workflow may receive a series of images showing a head of a person from various positions. In certain implementations, a user of an interactive video game may employ a video camera-equipped portable computing device (such as a smartphone) to acquire such images. In an illustrative example, a smartphone may be programmed to acquire a series of images with a certain frequency while the stationary smartphone camera is focused on the user's head, which the user is instructed to slowly rotate. In certain implementations, the series of images may be accompanied by the associated metadata such as the camera position relative to the object and/or camera settings, such as the ISO number, focal length, aperture, and/or shutter speed.

Figure 3:
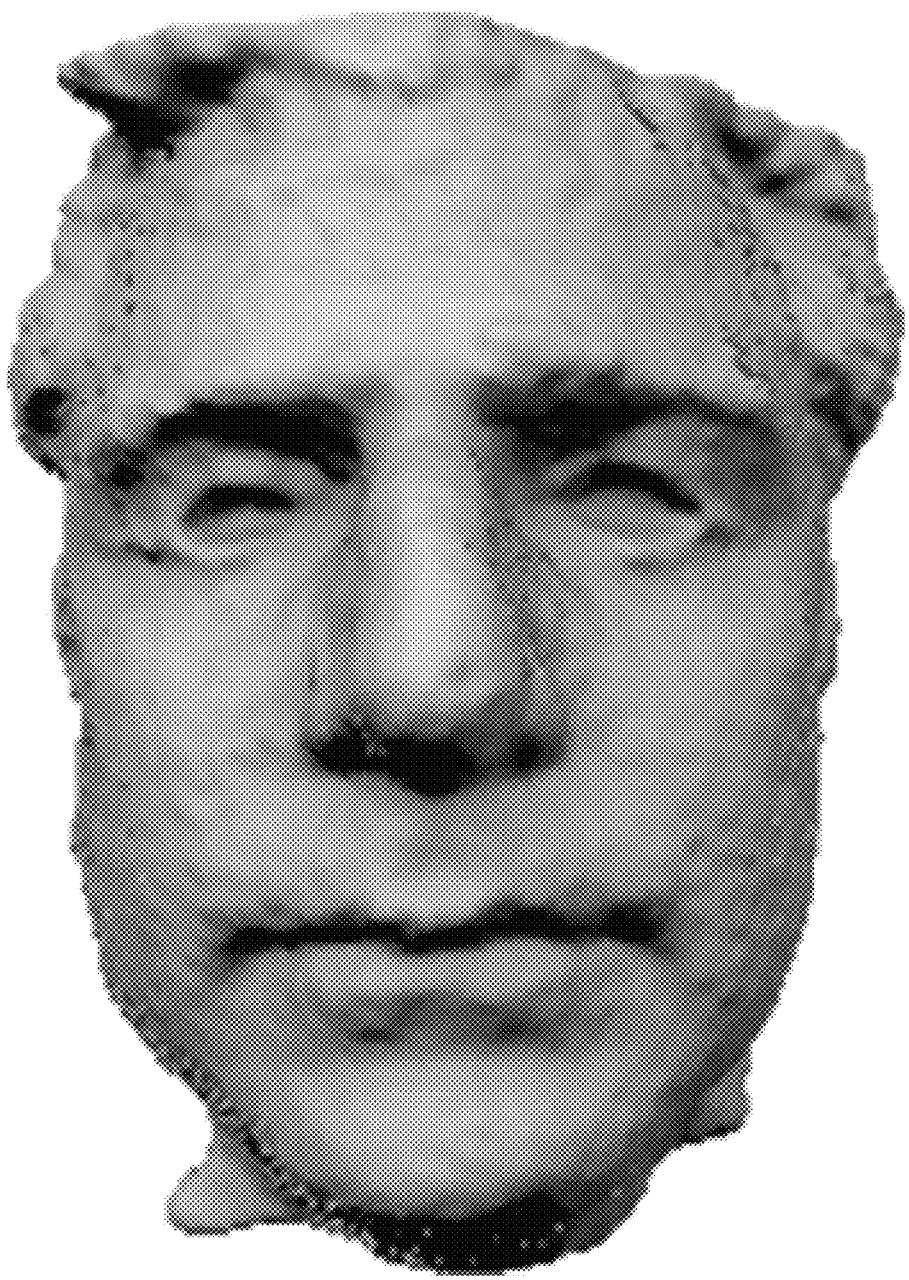
FIG. 3 schematically illustrates a polygonal mesh representing a rough scan model of a head, in accordance with one or more aspects of the present disclosure.

At block 215, the processing workflow may process the acquired images to produce a polygonal mesh representing a rough scan model of the user's head, as schematically illustrated by FIG. 3. Scan model 310 may be produced by comparing certain parameters (such as luminance or color gradients) of various areas of the modeled object in several images to yield the three-dimensional object representation. The scan model parameters may not be aligned with the target application topology, and hence the scan model may not be suitable for being directly used by the target application (such as an interactive video game).

Figure 4:
FIG. 4 schematically illustrates an example edge-finding image, in accordance with one or more aspects of the present disclosure.

At block 220, the processing workflow may produce an edge-finding image that may be derived from one or more of the original images of the person's head. An example edge-finding image 410 is schematically illustrated by FIG. 4. The process of generating the edge-finding image may analyze the luminance gradients to detect the positions of curvatures corresponding to certain anatomical feature points of the person's head (such as nose, eyes, lips, etc.).

Figure 5:
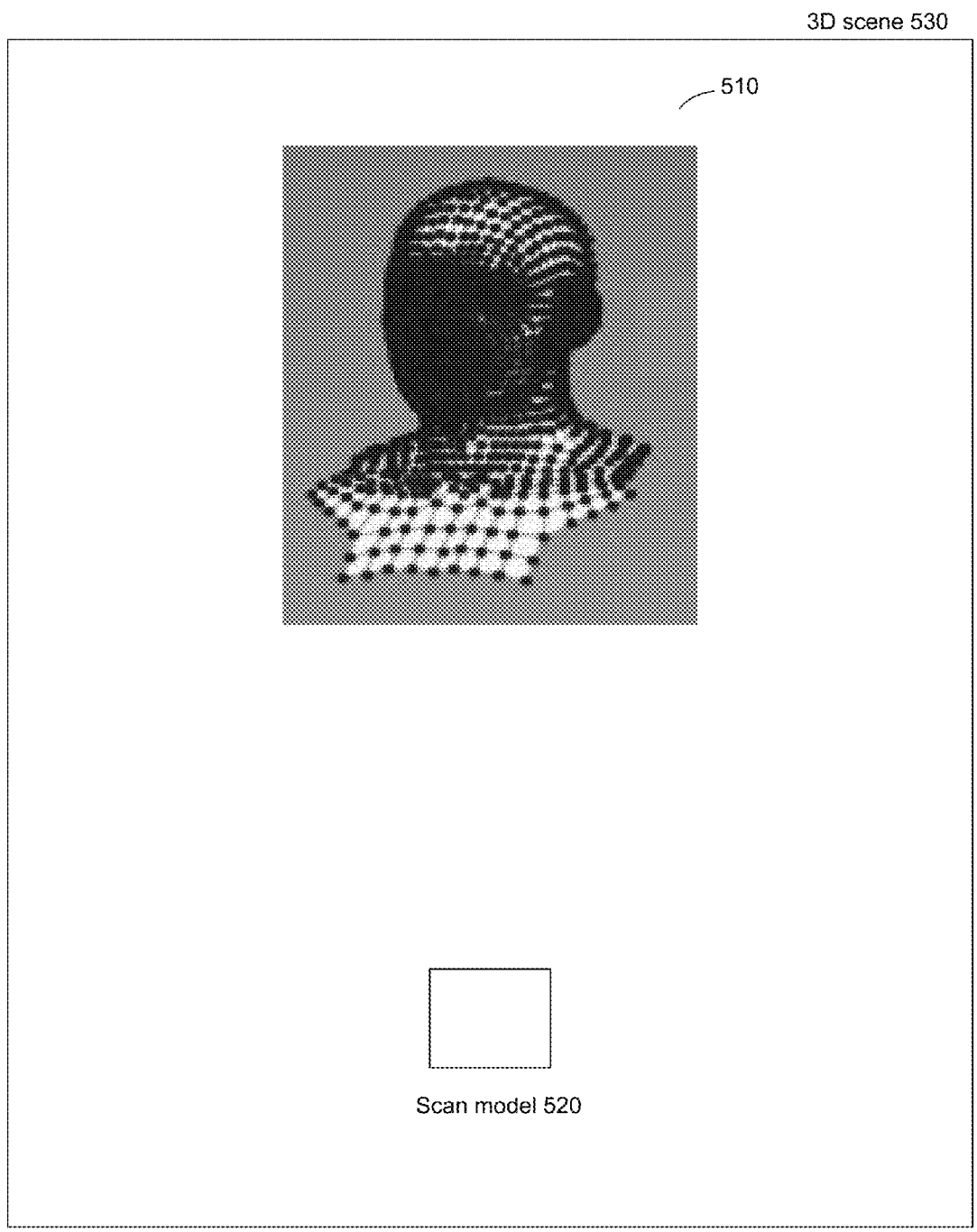
FIG. 5 schematically illustrates a scan model and a base polygonal mesh placed within the same scene in a three-dimensional space, in accordance with one or more aspects of the present disclosure.

At block 225, the processing workflow may place the scan model and a base polygonal mesh within the same scene in a three-dimensional space, as schematically illustrated by FIG. 5. Base polygonal mesh 510 may be compliant with the target application topology, e.g., in the type of polygonal faces, resolution, and/or other parameters.

In an illustrative example, scan model 520 and base polygonal mesh 510 may be placed within the same three-dimensional scene 530 in a manner that minimizes the differences in the positions and orientations of certain corresponding elements of both meshes. In certain implementations, the position of scan model 520 within three-dimensional scene 530 may be determined using the edge-finding image produced by the operations described herein above with reference to block 220.

Figure 6:
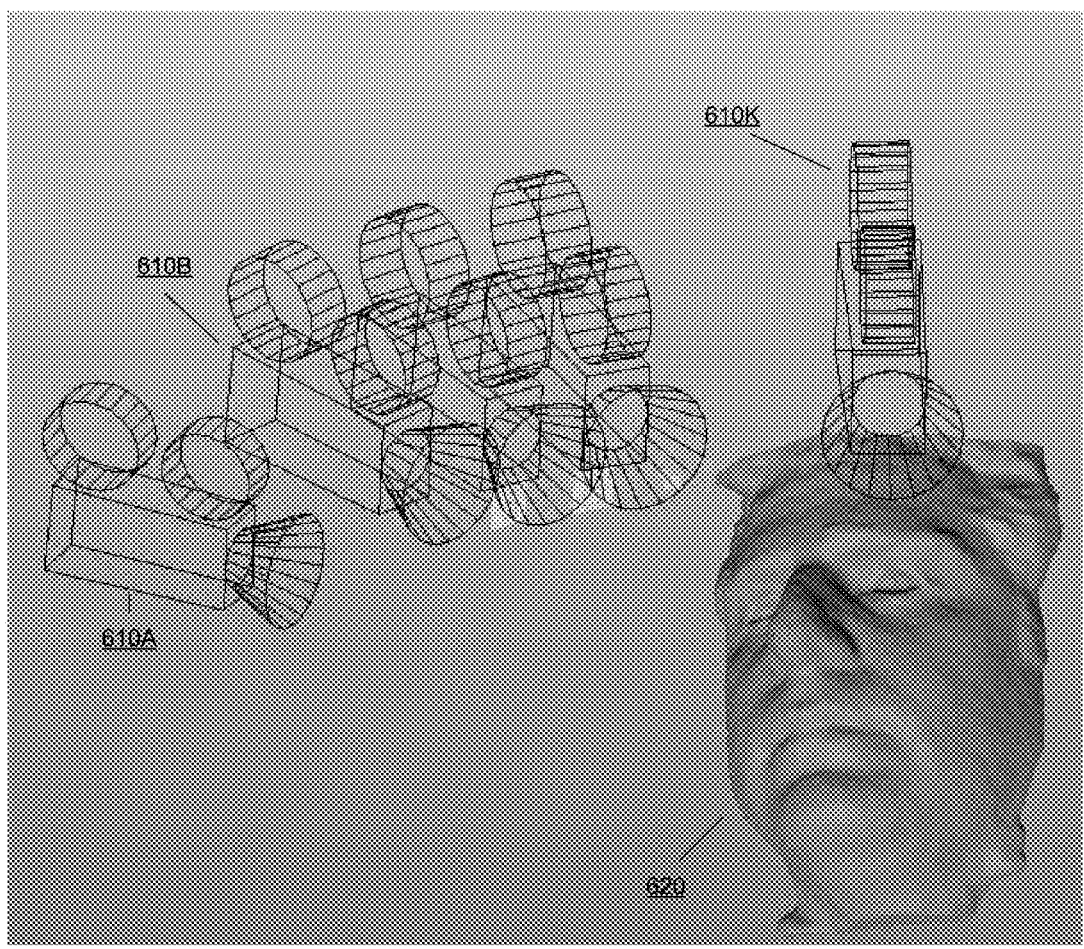
FIG. 6 schematically illustrates generating the camera information, in accordance with one or more aspects of the present disclosure.

At block 230, the processing workflow may generate the camera information, as schematically illustrated by FIG. 6. In an illustrative example, each image of the series of image may be associated with a camera 610A-610K, the position of which relative to scan model 620 may be determined using the image metadata associated with the image files. For each camera, the processing workflow may produce a transformation matrix defining the camera position relative to the object being imaged, the camera orientation, and the scale of the associated image.

Figure 7:
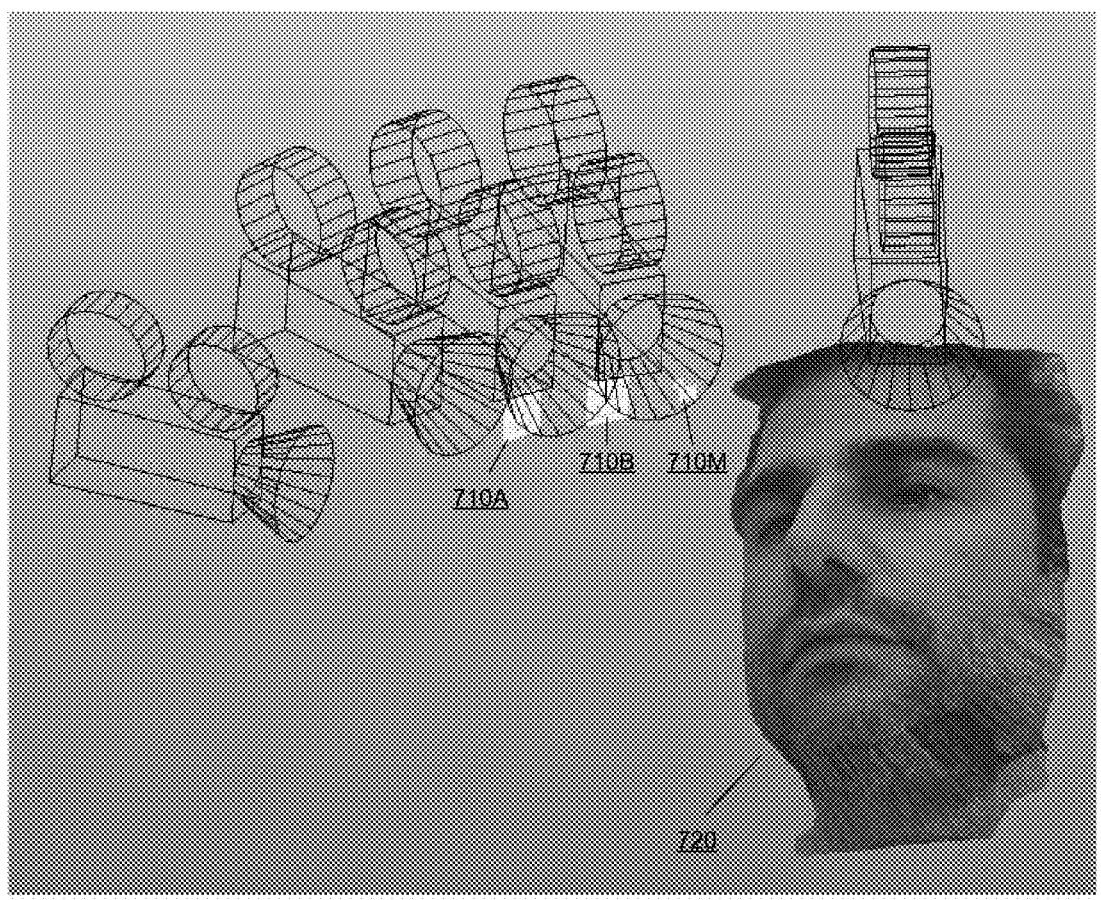
FIG. 7 schematically illustrates projecting acquired images onto the scan model, in accordance with one or more aspects of the present disclosure.

At block 235, the processing workflow may project the acquired images onto the scan model, as schematically illustrated by FIG. 7. In an illustrative example, each image 710A-710M may be projected to scan model 720 using the camera information produced by the operations described herein above with reference to block 230.

Figure 8:
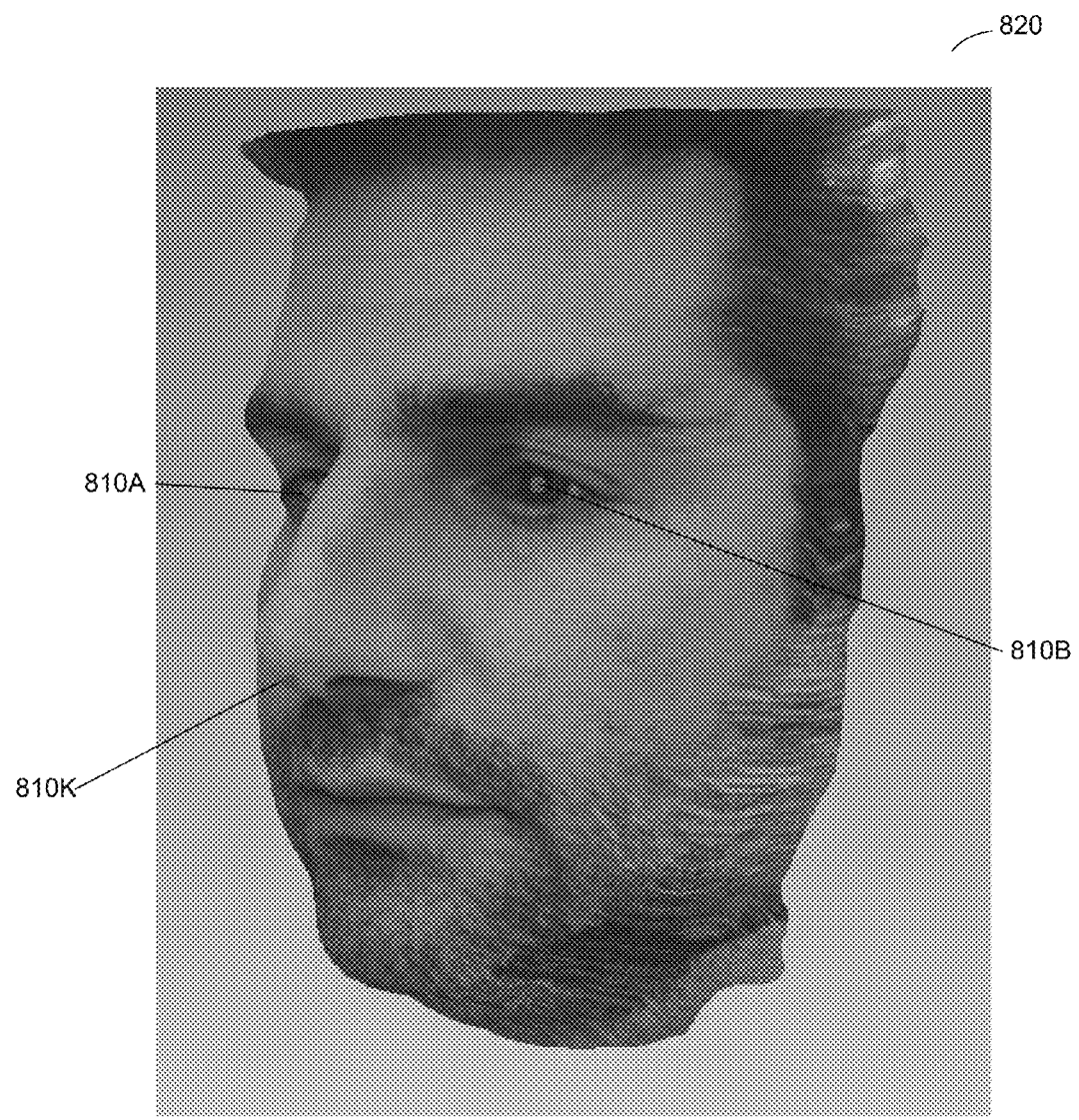
FIG. 8 schematically illustrates projecting detected anatomical features onto the scan model, in accordance with one or more aspects of the present disclosure.

At block 240, the processing workflow may detect certain anatomical features (such as nose, eye, and/or lips) within the acquired images and, using the image mapping information produced by the operations described herein above with reference to block 235, project the detected anatomical features onto the scan model, as schematically illustrated by FIG. 8. In an illustrative example, the processing workflow may determine positions 810A-810K of certain anatomical features (such as nose, eye, and/or lips) on scan model 820.

Figure 9:
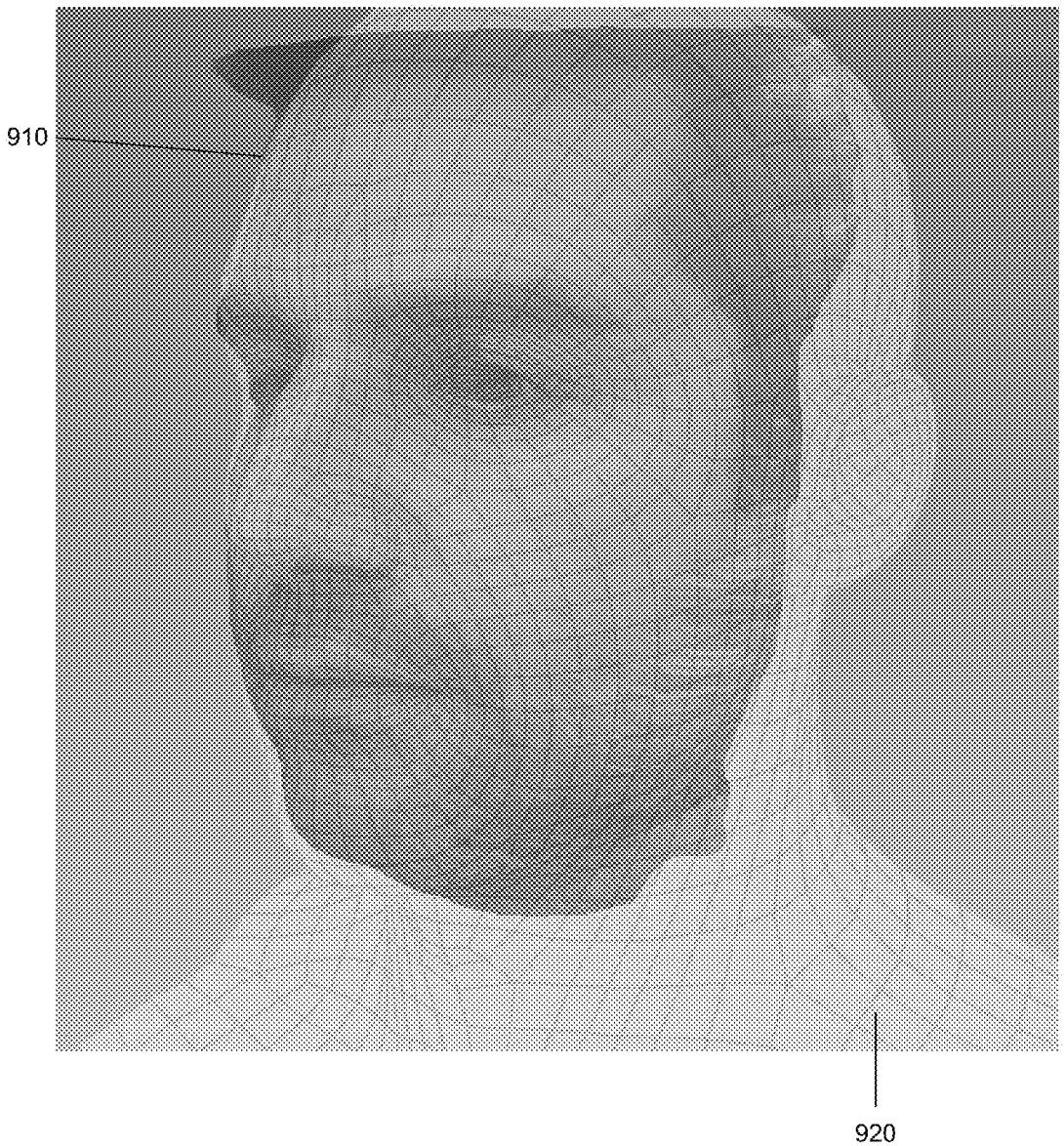
FIG. 9 schematically illustrates transforming the scan model to align with the base polygonal mesh, in accordance with one or more aspects of the present disclosure.

At block 245, the processing workflow may transform the scan model to align with the base polygonal mesh. Transforming the scan model may comprise modifying positions, orientations, and/or sizes of one or more polygonal faces of the scan model. As schematically illustrated by FIG. 9, the processing workflow may transform scan model 910 to adjust the positions and/or orientations of certain anatomical features (such as nose, eyes, and/or lips) in order to minimize the difference in positions, orientations, and/or sizes of corresponding anatomical features in scan model 910 and base polygonal mesh 920.

In certain implementations, the processing workflow may employ a heuristic optimization method (such as iterative closest point and/or simulated annealing) to transform scan model 910 to minimize the differences in curvatures, point positions, and point normal orientations with respect to base polygonal mesh 920. In an illustrative example, the iterative closest point method may be employed to produce the initial approximation of the transformed scan model, which may be used as the starting point for further optimization by the simulated annealing method.

Figure 10:
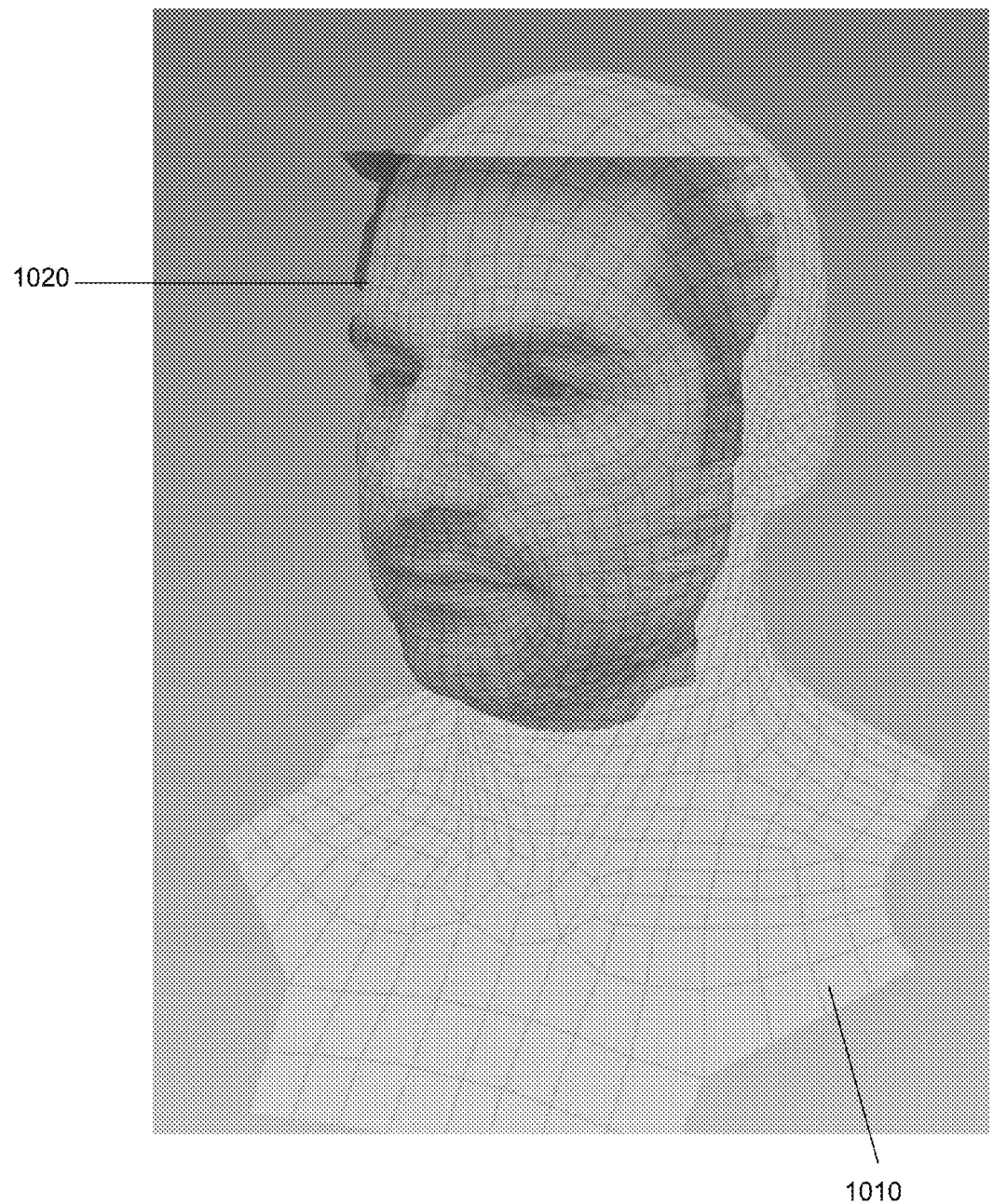
FIG. 10 schematically illustrates transform the base polygonal mesh to align it with the scan model, in accordance with one or more aspects of the present disclosure.

At block 250, the processing workflow may transform the base polygonal mesh to align it with the scan model. Transforming the base polygonal mesh may comprise modifying positions, orientations, and/or sizes of one or more polygonal faces of the base polygonal mesh. As schematically illustrated by FIG. 10, the processing workflow may transform base polygonal mesh 1510 by adjusting the positions and/or orientations of certain anatomical features (such as nose, eyes, and/or lips) in order to minimize the difference in positions, orientations, and/or sizes of corresponding anatomical features in scan model 1020 and in base polygonal mesh 1510. In certain implementations, the processing workflow may further transform the scan model by smoothing the model geometry (i.e., adjusting the curvatures of certain lines to bring the line curvature within a pre-defined range).

In certain implementations, the processing workflow may employ a heuristic optimization method (such as iterative closest point and/or simulated annealing) to transform base polygonal mesh 1510 to minimize the differences in curvatures, point positions, and point normal orientations with respect to scan model 1020. In an illustrative example, the iterative closest point method may be employed to produce the initial approximation of the transformed scan model, which may be used as the starting point for further optimization by the simulated annealing method.

At block 255, the processing workflow may further transform the base polygonal mesh, e.g., by blending certain areas of the scan model with corresponding areas of the base polygonal mesh, modifying edge loops, and merging some vertices of the scan model with corresponding vertices of the base polygonal mesh.

Figure 11:
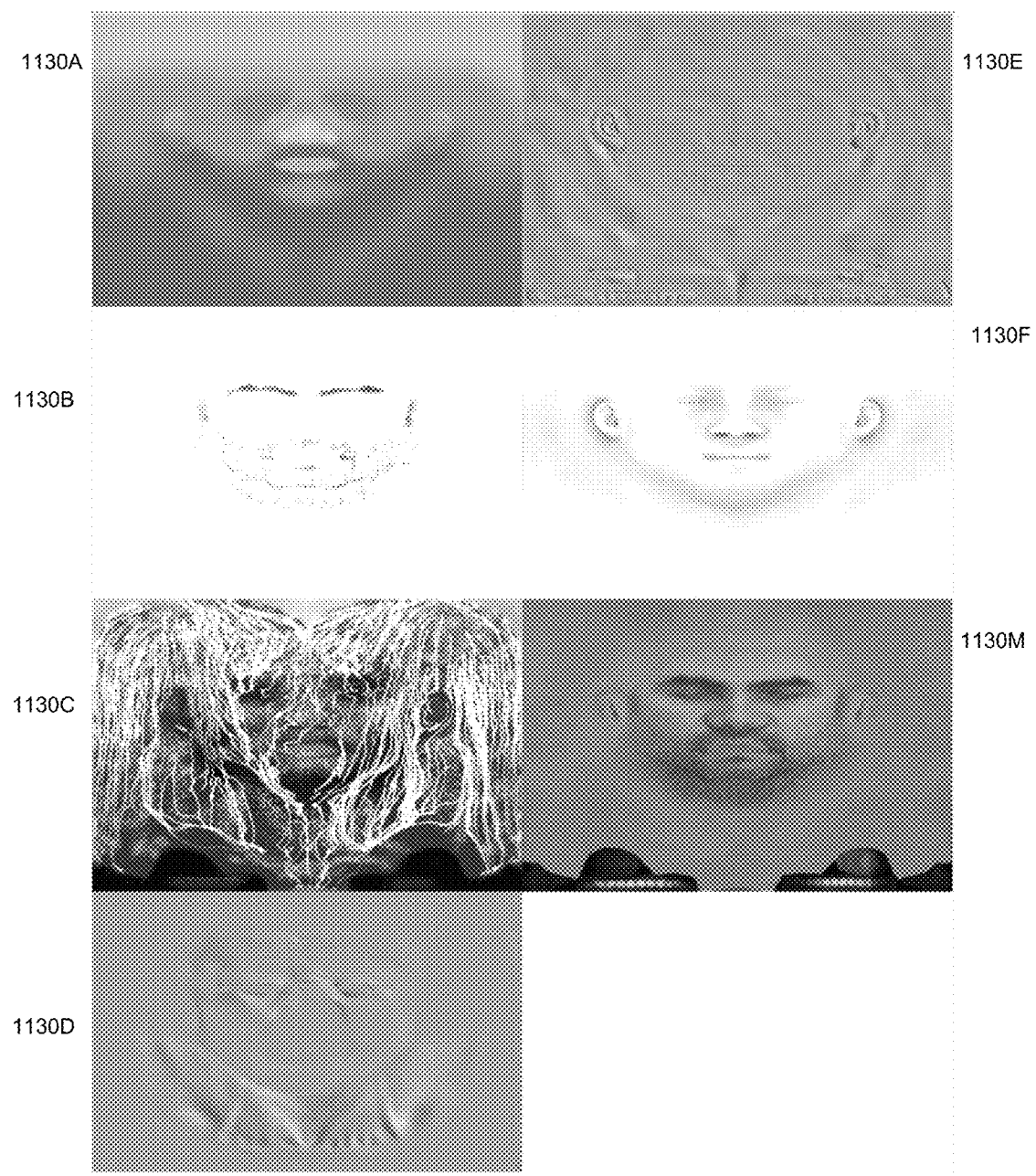
FIG. 11 schematically illustrates generating various textures for the target application-resolution model and UV layout, in accordance with one or more aspects of the present disclosure.

At block 260, the processing workflow may generate various textures, such as a light map, shaded color, color, normal, half bent normal, and occlusion textures, for the target application-resolution model and the UV layout, as schematically illustrated by FIG. 11. In an illustrative example, the processing workflow may project the images acquired by a subset of cameras (e.g., front and side cameras) onto the base polygonal mesh, and then transform the projected images into the UV space to produce one or more texture maps 1130A-1130M. For every pixel on the surface of the polygonal mesh, the processing workflow may select a corresponding pixel within an image pointed to by a normal vector associated with the pixel.

At block 265, the processing workflow may determine the skin tone to be applied to the textures. In certain implementations, the processing workflow may determine an average color of each texture image (e.g., by averaging the RGB values of all pixels of the image) and identify a generic skin tone having the average image color within a certain threshold range of the determined average image color of the texture image. The identified generic skin tone may then be applied to the textures.

At block 270, the processing workflow may output the application resolution and level of detail (LOD) resolution polygonal meshes and the color textures produced by the operations described herein above with reference to block 260.

In certain implementations, the objects produced by the above described processing workflow may be directly, without additional processing, employed in a target application (e.g., interactive video game) to produce a game character having a visual resemblance with the user of the interactive video game.

Figure 12:
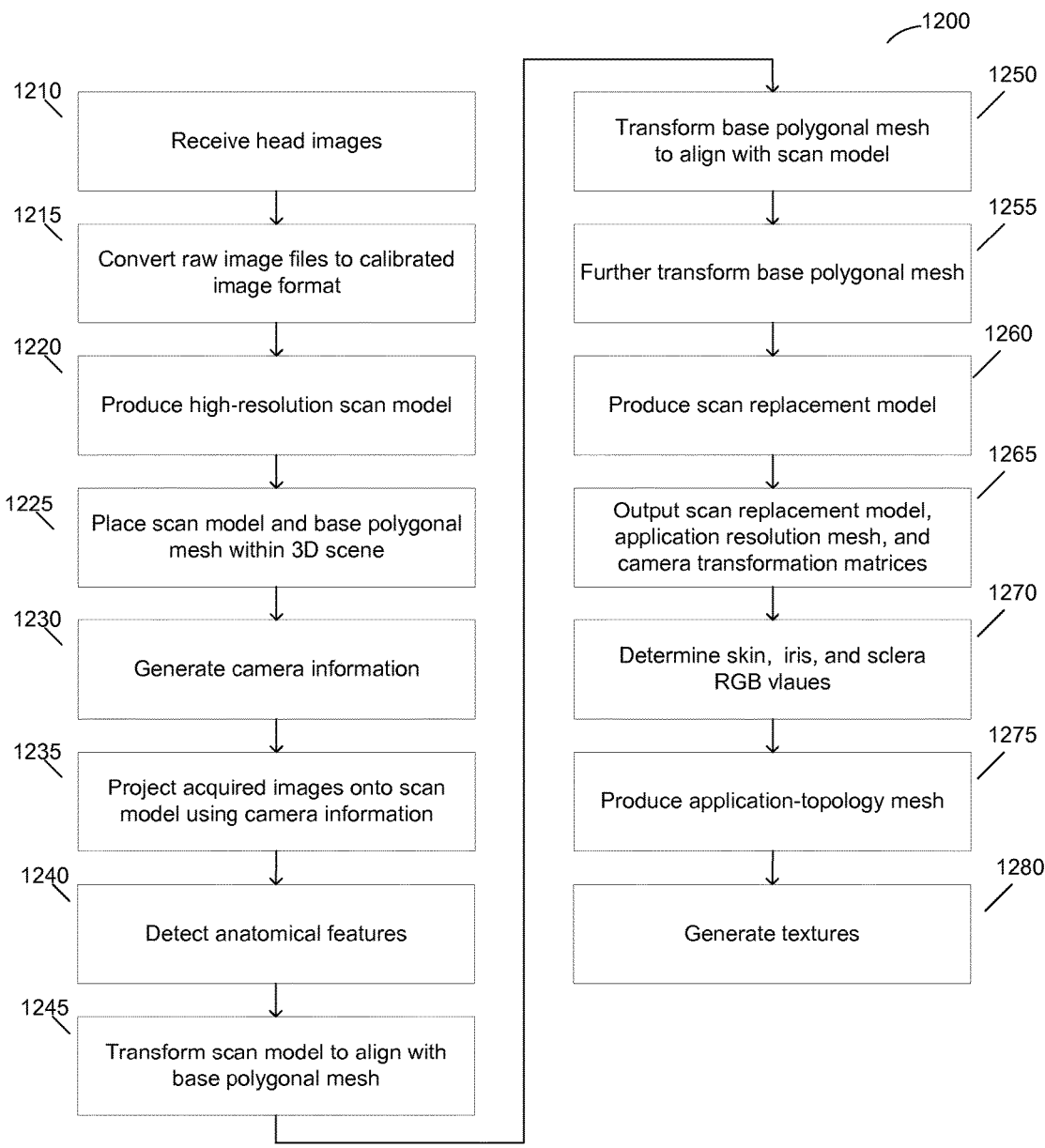
FIG. 12 schematically illustrates a flow diagram of an example artist-assisted processing workflow for generating three-dimensional visual objects representing a person based on two-dimensional images of at least a part of the person's body, in accordance with one or more aspects of the present disclosure.

FIG. 12 depicts a flow diagram of an example artist-assisted processing workflow 1200 for generating three-dimensional visual objects representing a person based on two-dimensional images of at least a part of the person's body, in accordance with one or more aspects of the present disclosure. Processing workflow 1200 may be employed for producing visual objects representing a game character having a visual resemblance with a certain person (e.g., a celebrity). The visual objects produced by processing workflow 1200 may be edited by an artist for further improving certain visual aspects of those objects.

Processing workflow 1200 and/or each of its individual functions, routines, subroutines, or operations may be performed by one or more general purpose and/or specialized processing devices. In certain implementations, certain operations of processing workflow 1200 may be performed by one or more general purpose computer systems (also referred to as servers), such as the computing device 1500, which is described herein below with references to FIG. 15.

Two or more functions, routines, subroutines, or operations of processing workflow 1200 may be performed in parallel or in an order which may differ from the order described above. In certain implementations, processing workflow 1200 may be implemented by a single processing thread. Alternatively, processing workflow 1200 may be implemented by two or more processing threads, each thread executing one or more individual functions, routines, subroutines, or operations of the method. In an illustrative example, the processing threads implementing processing workflow 1200 may be synchronized (e.g., using semaphores, critical sections, and/or other thread synchronization mechanisms). Alternatively, the processing threads implementing processing workflow 1200 may be executed asynchronously with respect to each other.

At block 1210, the processing workflow may receive a series of images showing a head of a person from various positions. In certain implementations, the series of images may be acquired using one or more general purpose or specialized still image cameras, which may be positioned around a stationary object (such as a person's head) and may optionally be equipped with synchronized light sources and/or auto-focusing lenses designed to produce high-quality images. In certain implementations, the light sources and the lenses may be cross-polarized (i.e., by placing a vertical polarization film in front of the light sources and a horizontal polarization film behind the lenses) to minimize the specular reflections.

In an illustrative example, the images received by the processing workflow may be in a raw image format. In certain implementations, the series of images may be accompanied by the associated metadata files comprising various image metadata such as the camera position relative to the object and/or camera settings, such as the ISO number, the focal length, aperture, and/or the shutter speed.

At block 1215, the processing workflow may convert the raw image files and associated metadata files to a calibrated image format, such as TIFF format. The produced TIFF files may comprise calibrated images and the associated image metadata.

Figure 13:
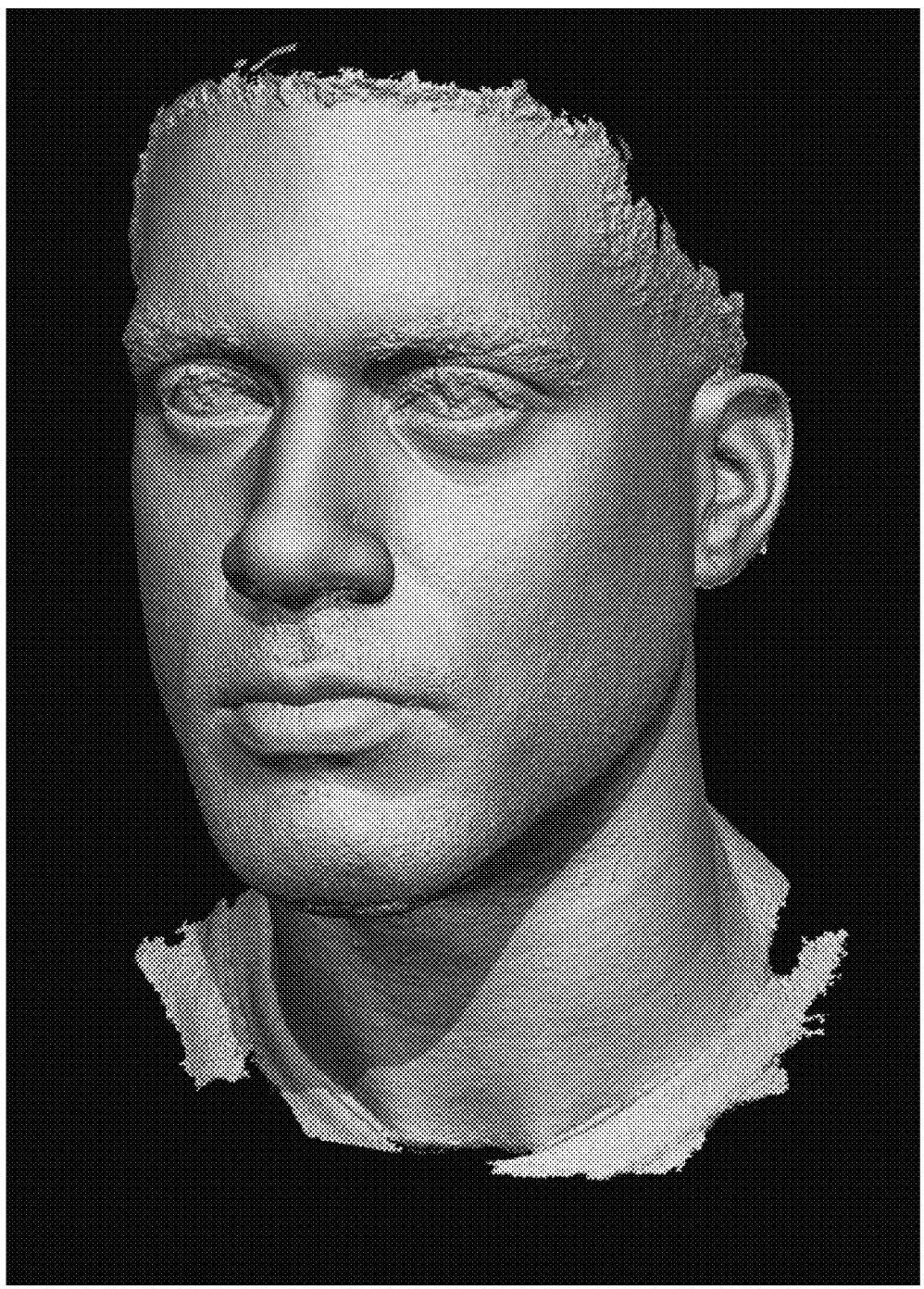
FIG. 13 schematically illustrates a polygonal mesh representing high-resolution scan model of a head, in accordance with one or more aspects of the present disclosure.

At block 1220, the processing workflow may produce a high-resolution polygonal mesh representing a scan model of the user's head (referred herein to as "scan model"), as schematically illustrated by FIG. 13. Scan model 1310 may be produced by comparing certain parameters (such as luminance or color gradients) of various areas of the modeled object in several images to yield the three-dimensional object representation. In certain implementations, blue channel images may be employed as the basis for producing the scan model, in order to minimize the scattered light noise in the images.

The scan model parameters may not be aligned with the target application topology, and hence the scan model may not be suitable for being directly used by the target application (such as an interactive video game). In certain implementations, the resolution of scan model 1310 may be significantly higher than the target application resolution.

At block 1225, the processing workflow may place the scan model and a base polygonal mesh within the same scene in a three-dimensional space, as schematically illustrated by FIG. 5. Base polygonal mesh 510 may be compliant with the target application topology, e.g., in the type of polygonal faces, resolution, and/or other parameters.

In an illustrative example, scan model 520 and base polygonal mesh 510 may be placed within the same three-dimensional scene 530 in a manner that minimizes the differences in the positions and orientations of certain corresponding elements 540A-540B of both meshes.

At block 1230, the processing workflow may generate the camera information, as schematically illustrated by FIG. 6. In an illustrative example, each image of the series of image may be associated with a camera 610A-610K, the position of which relative to scan model 620 may be determined using the image metadata associated with the image files. For each camera, the processing workflow may produce a transformation matrix defining the camera position relative to the object being imaged, the camera orientation, and the scale of the associated image.

At block 1235, the processing workflow may project the acquired images to the scan model, as schematically illustrated by FIG. 7. In an illustrative example, each image 710A-710M may be projected to scan model 720 using the camera information produced by the operations described herein above with reference to block 230.

At block 1240, the processing workflow may detect certain anatomical features (such as nose, eye, and/or lips) within the acquired images and, using the image mapping information produced by the operations described herein above with reference to block 1235, project the detected anatomical features onto the scan model, as schematically illustrated by FIG. 8. In an illustrative example, the processing workflow may determine positions 810A-810K of certain anatomical features (such as nose, eye, and/or lips) on scan model 820.

At block 1245, the processing workflow may transform the scan model to align with the base polygonal mesh. Transforming the scan model may comprise modifying positions, orientations, and/or sizes of one or more polygonal faces of the scan model. As schematically illustrated by FIG. 9, the processing workflow may transform scan model 910 to adjust the positions and/or orientations of certain anatomical features (such as nose, eyes, and/or lips) in order to minimize the difference in positions, orientations, and/or sizes of corresponding anatomical features in scan model 910 and base polygonal mesh 920.

In certain implementations, the processing workflow may employ a heuristic optimization method (such as iterative closest point and/or simulated annealing) to transform scan model 910 to minimize the differences in curvatures, point positions, and point normal orientations with respect to base polygonal mesh 920. In an illustrative example, the iterative closest point method may be employed to produce the initial approximation of the transformed scan model, which may be used as the starting point for further optimization by the simulated annealing method.

At block 1250, the processing workflow may transform the base polygonal mesh to align it with the scan model. Transforming the base polygonal mesh may comprise modifying positions, orientations, and/or sizes of one or more polygonal faces of the base polygonal mesh. As schematically illustrated by FIG. 10, the processing workflow may transform base polygonal mesh 1510 by adjusting the positions and/or orientations of certain anatomical features (such as nose, eyes, and/or lips) in order to minimize the difference in positions, orientations, and/or sizes of corresponding anatomical features in scan model 1030 and in base polygonal mesh 1510. In certain implementations, the processing workflow may further transform the scan model by smoothing the model geometry (i.e., adjusting the curvatures of certain lines to bring the line curvature within a pre-defined range).

In certain implementations, the processing workflow may employ a heuristic optimization method (such as iterative closest point and/or simulated annealing) to transform base polygonal mesh 1510 to minimize the differences in curvatures, point positions, and point normal orientations with respect to scan model 1030. In an illustrative example, the iterative closest point method may be employed to produce the initial approximation of the transformed scan model, which may be used as the starting point for further optimization by the simulated annealing method.

At block 1255, the processing workflow may further transform the base polygonal mesh, e.g., by blending certain areas of the scan model with corresponding areas of the base polygonal mesh, modifying edge loops, and merging some vertices of the scan model with corresponding vertices of the base polygonal mesh.

Figure 14:
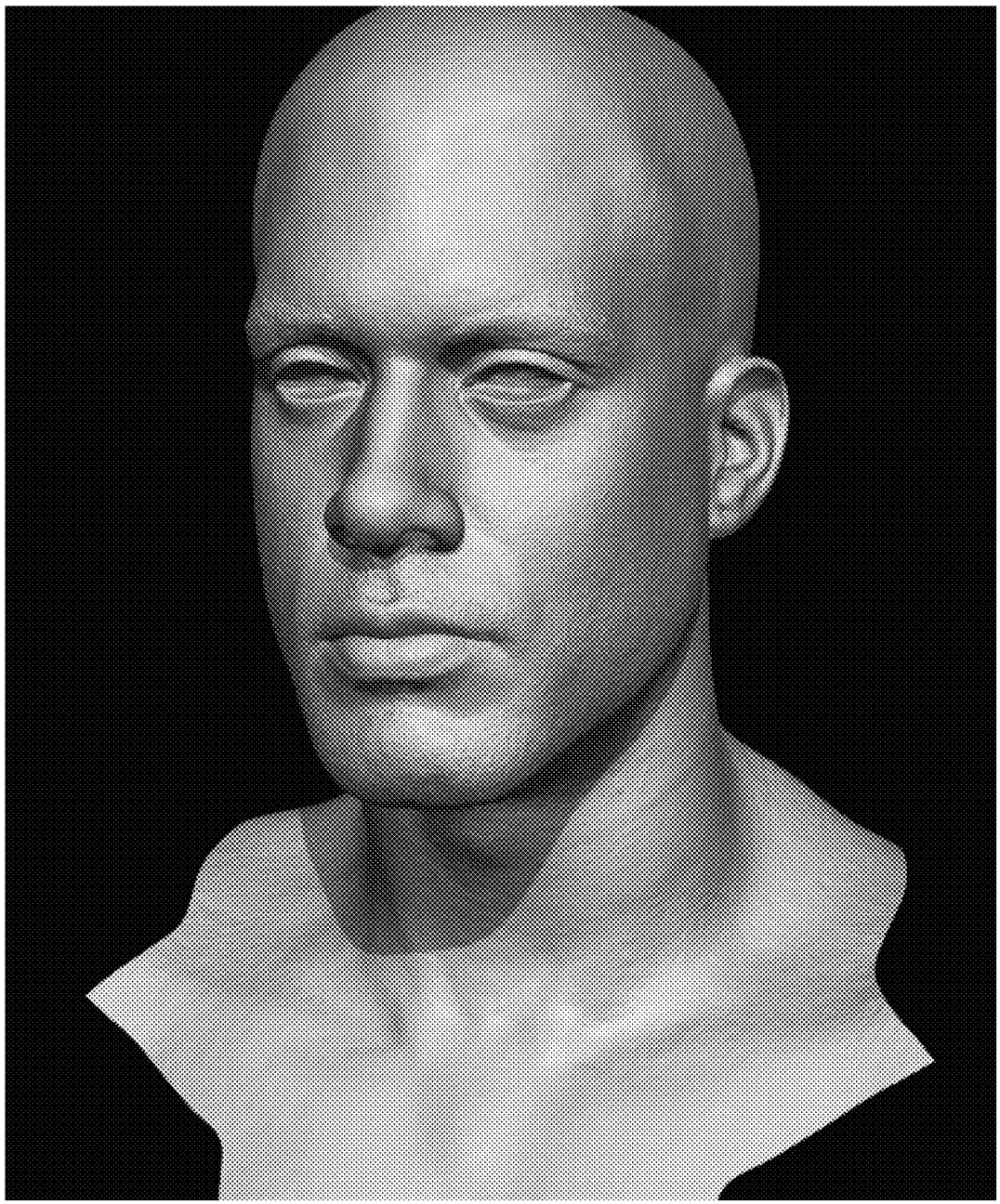
FIG. 14 schematically illustrates producing a scan replacement model by projecting the scan details onto the high-resolution scan model, in accordance with one or more aspects of the present disclosure.

At block 1260, the processing workflow may produce a scan replacement model by projecting the scan details onto the high-resolution scan model 1410, as schematically illustrated by FIG. 14.

At block 1265, the processing workflow may output the scan replacement model, the application-resolution polygonal mesh, the undistorted versions of the original images, and the camera transformation matrices with the associated metadata.

At block 1270, the processing workflow may determine and output the average skin RGB value, the iris RGB value, and the sclera RGB value. The processing workflow may then load a skin tone template, determine the biased average RGB value for each generic albedo/base color skin tone texture layer, and find a closest fit to the sampled biased RGB value of the scan texture by converting all sampled RGB values to XYZ, plotting them in three-dimensional Cartesian coordinate space, and finding the shortest distance between the templates and scan sampled RGB values. The same operations may be performed for the iris color and the sclera color.

At block 1275, the processing workflow may load the application-resolution model and the high-resolution scan replacement model. The processing workflow may iteratively subdivide the application-resolution model and project the details from the scan replacement model, producing an application-topology mesh with several subdivision levels including the scan details, for subsequent editing by the user. The processing workflow may export the highest subdivision level overwriting the scan replacement model.

At block 1280, the processing workflow may generate various textures, such as a light map, shaded color, color, normal, half bent normal, and occlusion textures, for the target application-resolution model and the UV layout, as schematically illustrated by FIG. 11. In an illustrative example, the processing workflow may project the images acquired by a subset of cameras (e.g., front and side cameras 1110A-1110C) onto the base polygonal mesh 1120, and then transform the projected images into the UV space to produce one or more texture maps 1130A-1130M. For every pixel on the surface of the polygonal mesh, the processing workflow may select a corresponding pixel within an image pointed to by a normal vector associated with the pixel. The processing workflow may then export a file storing the base color texture and additional layers to assist the user in creating a game-ready color texture.

In certain implementations, the files produced by the processing workflow, including the polygonal mesh and the textures, may be edited by an artist in order to improve certain visual aspects of these objects.

Figure 15:
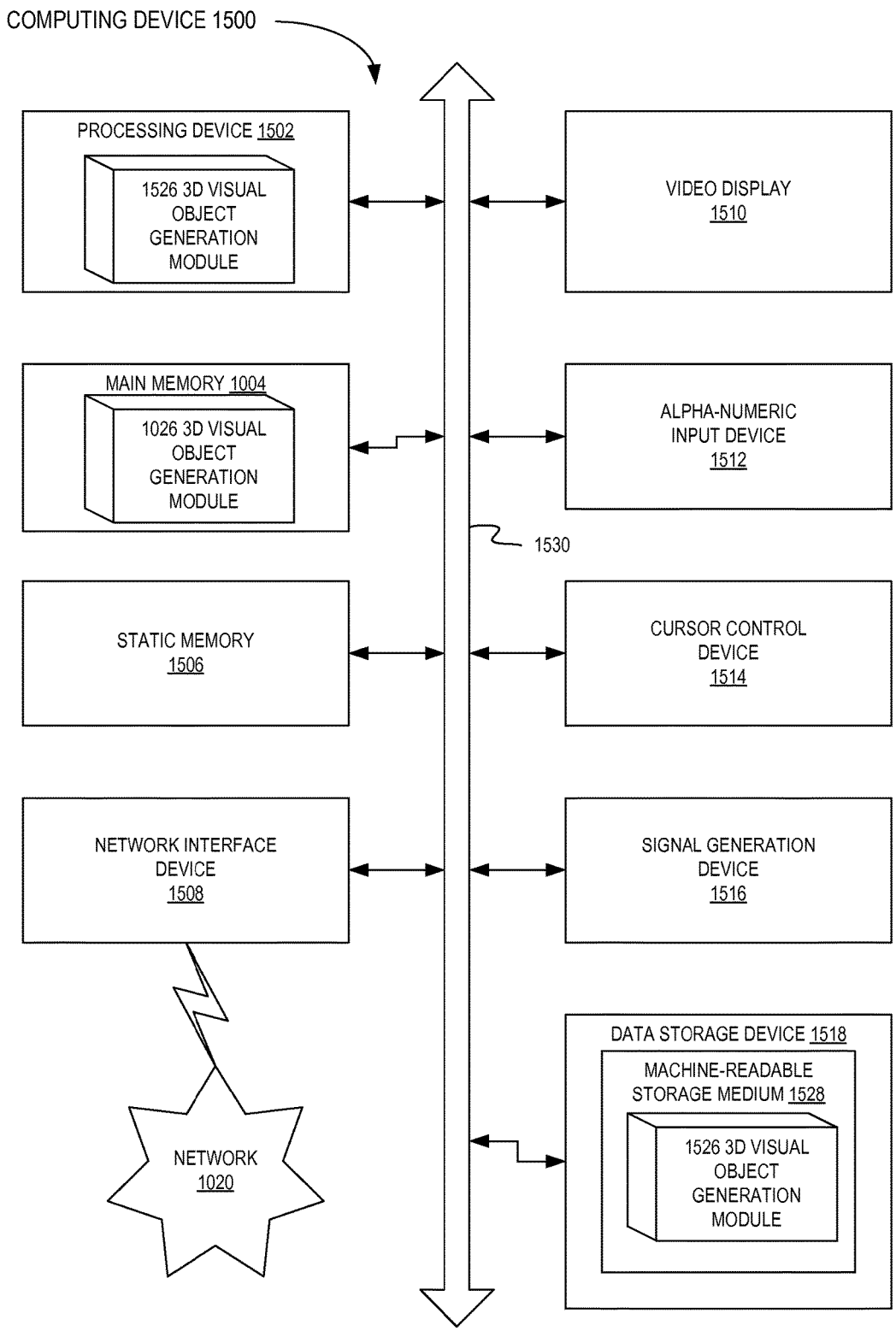
FIG. 15 depicts a block diagram of an illustrative computing device operating in accordance with one or more aspects of the present disclosure.

FIG. 15 illustrates a diagrammatic representation of a computing device 1500 which may implement the systems and methods described herein. Computing device 1500 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1500 may include a processing device (e.g., a general purpose processor) 1502, a main memory 1504 (e.g., synchronous dynamic random access memory (DRAM), read-only memory (ROM)), a static memory 1506 (e.g., flash memory and a data storage device 1518), which may communicate with each other via a bus 1530.

Processing device 1502 may be provided by one or more general-purpose processing devices such as a microprocessor, central processing unit, or the like. In an illustrative example, processing device 1502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1502 may also comprise one or more special-purpose processing devices such as an application specific integrated circuit (ASIC), a field programmable gate array (FPGA), a digital signal processor (DSP), network processor, or the like. The processing device 1502 may be configured to execute module 1526 implementing workflows 200 and/or 1200 for generating three-dimensional visual objects representing a person based on two-dimensional images of at least a part of the person's body, in accordance with one or more aspects of the present disclosure, for performing the operations and steps discussed herein.

Computing device 1500 may further include a network interface device 1508 which may communicate with a network 1520. The computing device 1500 also may include a video display unit 1515 (e.g., a liquid crystal display (LCD) or a cathode ray tube (CRT)), an alphanumeric input device 1512 (e.g., a keyboard), a cursor control device 1514 (e.g., a mouse) and an acoustic signal generation device 1516 (e.g., a speaker). In one embodiment, video display unit 1515, alphanumeric input device 1512, and cursor control device 1514 may be combined into a single component or device (e.g., an LCD touch screen).

Data storage device 1518 may include a computer-readable storage medium 1528 on which may be stored one or more sets of instructions, e.g., instructions of module 1526 implementing workflows 200 and/or 1200 for generating three-dimensional visual objects representing a person based on two-dimensional images of at least a part of the person's body. Instructions implementing module 1526 may also reside, completely or at least partially, within main memory 1504 and/or within processing device 1502 during execution thereof by computing device 1500, main memory 1504 and processing device 1502 also constituting computer-readable media. The instructions may further be transmitted or received over a network 1520 via network interface device 1508.

While computer-readable storage medium 1528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    receiving, by a processing device, a first polygonal mesh representing a human body part, wherein the first polygonal mesh is compliant with a target application topology;
    receiving a second polygonal mesh representing the human body part, wherein the second polygonal mesh is derived from a plurality of images of a person;
    detecting an anatomical feature within an image of the plurality of images;
    projecting, using a camera transformation matrix, the detected anatomical feature onto the second polygonal mesh; and
    aligning the first polygonal mesh and the second polygonal mesh in view of a position of the anatomical feature.

2. The method of claim 1, further comprising:
    receiving the plurality of images from a mobile computing device.

3. The method of claim 1, further comprising:
    receiving the plurality of images from a specialized computing device equipped with a still image camera and a light source, wherein a lens of the still image camera and the light source are equipped with cross-polarizing filters.

4. The method of claim 1, wherein the part of the human body comprises a head.

5. The method of claim 1, wherein optimizing the value of the metric comprises performing a simulating annealing method.

6. The method of claim 1, wherein optimizing the value of the metric comprises performing an iterative closest point method.

7. The method of claim 1, wherein modifying the first polygonal mesh comprises modifying at least one of: a position of a polygonal face of the first polygonal mesh or an orientation of a polygonal face of the first polygonal mesh.

8. The method of claim 1, further comprising:
    producing a camera transformation matrix defining at least one of: a position of a camera relative to an object being imaged, an orientation of the camera, or a scale an image produced by the camera.

9. The method of claim 1, further comprising: generating an edge-finding image by analyzing a luminance gradient to detect a position of a first curvature corresponding to the anatomical feature.

10. The method of claim 1, further comprising:
    producing a texture by mapping a plurality of image pixels to a surface defined by the first polygonal mesh.

11. The method of claim 10, wherein the texture comprises at least one of: a light map, a shaded color map, a color map, a normal map, a half bent normal map, or an occlusion map.

12. The method of claim 10, further comprising:
    analyzing one or more images of the plurality of images to determine a skin tone to be applied to the texture.

13. The method of claim 10, further comprising:
    determining a skin tone to be applied to the texture.

14. The method of claim 10, further comprising:
    producing at least one of a first file comprising a representation of the first polygonal mesh and a second file comprising a representation of the texture.

15. The method of claim 14, further comprising:
    providing at least one of the first file and the second file for editing by an artist user.

16. A computer-readable non-transitory storage medium comprising executable instructions to cause a processing device to:
    receive, by the processing device, a first polygonal mesh representing a human body part, wherein the first polygonal mesh is compliant with a target application topology;
    receive a second polygonal mesh representing the human body part, wherein the second polygonal mesh is derived from a plurality of images of a person;
    detect an anatomical feature within an image of the plurality of images;
    project, using a camera transformation matrix, the detected anatomical feature onto the second polygonal mesh; and align the first polygonal mesh and the second polygonal mesh in view of a position of the anatomical feature.

* * * * *